United States Patent
Song et al.

(10) Patent No.: US 11,005,867 B1
(45) Date of Patent: May 11, 2021

(54) SYSTEMS AND METHODS FOR TUNING APPLICATION NETWORK BEHAVIOR

(71) Applicant: CA, INC., San Jose, CA (US)

(72) Inventors: Qu Bo Song, Singapore (SG); Weiliang Li, Singapore (SG)

(73) Assignee: CA, Inc., San Jose, CA (US)

( * ) Notice: Subject to any disclaimer, the term of this patent is extended or adjusted under 35 U.S.C. 154(b) by 191 days.

(21) Appl. No.: 16/009,125

(22) Filed: Jun. 14, 2018

(51) Int. Cl.
*H04L 29/06* (2006.01)
*H04W 24/08* (2009.01)

(52) U.S. Cl.
CPC ...... *H04L 63/1425* (2013.01); *H04L 63/0227* (2013.01); *H04L 63/1416* (2013.01); *H04W 24/08* (2013.01)

(58) Field of Classification Search
CPC ............ H04L 63/1425; H04L 63/1416; H04L 63/0227; H04W 24/08
See application file for complete search history.

(56) References Cited

U.S. PATENT DOCUMENTS

| | | | | |
|---|---|---|---|---|
| 8,406,792 | B2* | 3/2013 | Aaltonen | H04W 12/08 455/466 |
| 2003/0097439 | A1* | 5/2003 | Strayer | H04L 63/1408 709/224 |
| 2006/0036728 | A1* | 2/2006 | Xie | H04L 51/04 709/224 |
| 2008/0052774 | A1* | 2/2008 | Chesla | G06F 21/552 726/13 |
| 2008/0140845 | A1* | 6/2008 | Yates | A63F 13/12 709/227 |
| 2009/0092060 | A1* | 4/2009 | Goto | H04L 63/0428 370/254 |
| 2010/0208611 | A1* | 8/2010 | Ray | H04L 45/00 370/252 |
| 2010/0223364 | A1* | 9/2010 | Wei | H04L 29/04 709/220 |
| 2010/0232448 | A1* | 9/2010 | Sugumar | G06F 15/17337 370/412 |
| 2013/0347094 | A1* | 12/2013 | Bettini | G06F 21/577 726/11 |
| 2014/0140213 | A1* | 5/2014 | Raleigh | H04L 65/601 370/235 |

(Continued)

OTHER PUBLICATIONS

IP.com Search Query Jun. 15, 2020 (Year: 2020).*
IP.com Search Query Oct. 6, 2020 (Year: 2020).*

*Primary Examiner* — Samson B Lemma
*Assistant Examiner* — Blake Narramore
(74) *Attorney, Agent, or Firm* — FisherBroyles, LLP

(57) ABSTRACT

The disclosed computer-implemented method for tuning application network behavior may include identifying an application for a closed operating system. The closed operating system may prevent applications from implementing machine-level traffic control for network traffic. The method may include determining an expected network behavior of the application, intercepting network traffic of the application on the closed operating system, determining whether the intercepted network traffic conforms to the expected network behavior, and modifying, based on the determining whether the intercepted network traffic conforms to the expected network behavior, the network traffic. Various other methods, systems, and computer-readable media are also disclosed.

20 Claims, 7 Drawing Sheets

(56) References Cited

U.S. PATENT DOCUMENTS

| | | | |
|---|---|---|---|
| 2015/0236995 A1* | 8/2015 | Hammer | H04L 51/28 709/206 |
| 2015/0309813 A1* | 10/2015 | Patel | G06F 11/3664 703/22 |
| 2016/0359878 A1* | 12/2016 | Prasad | G06F 16/285 |
| 2017/0078323 A1* | 3/2017 | Ross | H04L 63/1433 |
| 2018/0295140 A1* | 10/2018 | Lu | H04L 63/1416 |
| 2019/0220580 A1* | 7/2019 | Brison | G06F 21/00 |

\* cited by examiner

SYSTEMS AND METHODS FOR TUNING APPLICATION NETWORK BEHAVIOR

BACKGROUND

As wireless networks and other computer networks become more prevalent, computing devices can remain always connected. Mobile devices such as smartphones may always have access to mobile networks. With such connectivity, security becomes a more important consideration. Applications may become infected with malware or otherwise compromised, which may result in leaking sensitive data to unauthorized machines.

Traffic control software, such as firewalls and other similar applications which may control machine-level network traffic, may be deployed on computing devices to control or tune network traffic of each application. However, many mobile device platforms utilize closed operating systems. Closed operating systems, based on closed source code, often prevents applications from controlling machine-level network traffic. Traffic control software may not be available for closed operating systems for tuning network behavior of applications.

The instant disclosure, therefore, identifies and addresses a need for systems and methods for tuning application network behavior.

SUMMARY

As will be described in greater detail below, the instant disclosure describes various systems and methods for tuning application network behavior.

In one example, a method for tuning application network behavior may include (1) identifying an application for a closed operating system. The closed operating system may prevent applications from implementing machine-level traffic control for network traffic. The method may also include (2) determining an expected network behavior of the application, (3) intercepting network traffic of the application on the closed operating system, (4) determining whether the intercepted network traffic conforms to the expected network behavior, and (5) modifying, based on the determining whether the intercepted network traffic conforms to the expected network behavior, the network traffic.

In some examples, determining whether the network traffic conforms to the expected network behavior may include parsing the network traffic to determine at least one of a source application, a destination, and a payload of the network traffic. In some examples, determining whether the network traffic conforms to the expected network behavior may include determining whether the source application is expected to communicate with the destination. In some examples, determining whether the network traffic conforms to the expected network behavior may include determining whether the source application is expected to send the payload to the destination.

In some examples, modifying the network traffic may include blocking the network traffic between a source application and a destination that does not conform to the expected network behavior. In some examples, modifying the network traffic may include changing a destination of the network traffic based on the expected network behavior. In some examples, modifying the network traffic may include changing a payload of the network traffic based on the expected network behavior.

In some examples, the expected network behavior of the application may include is based on empirical data of network behavior of the application. In some examples, identifying the application may include identifying a version number of the application.

In one embodiment, a system for tuning application network behavior may include several modules stored in memory, including an identification module for identifying an application for a closed operating system. The closed operating system may prevent applications from implementing machine-level traffic control for network traffic. The system may also include an examination module, stored in memory, for determining an expected network behavior of the application, an interception module, stored in memory, for intercepting network traffic of the application on the closed operating system, a determination module, stored in memory, for determining whether the intercepted network traffic conforms to the expected network behavior, an identification module, stored in memory, for modifying, based on the determining whether the intercepted network traffic conforms to the expected network behavior, the network traffic, and at least one physical processor that executes the identification module, the examination module, the interception module, the determination module, and the modification module.

In some examples, determining whether the network traffic conforms to the expected network behavior may include parsing the network traffic to determine at least one of a source application, a destination, and a payload of the network traffic. In some examples, determining whether the network traffic conforms to the expected network behavior may include determining whether the source application is expected to communicate with the destination. In some examples, determining whether the network traffic conforms to the expected network behavior may include determining whether the source application is expected to send the payload to the destination.

In some examples, modifying the network traffic may include at least one of blocking the network traffic between a source application and a destination that does not conform to the expected network behavior, and changing a destination of the network traffic based on the expected network behavior. In some examples, modifying the network traffic may include changing a payload of the network traffic by removing data from the payload which does not conform to the expected network behavior.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an application for a closed operating system. The closed operating system may prevent applications from implementing machine-level traffic control for network traffic. The instructions may also cause the computing device to (2) determine an expected network behavior of the application, (3) intercept network traffic of the application on the closed operating system, (4) determine whether the intercepted network traffic conforms to the expected network behavior, and (5) modify, based on the determining, the network traffic.

In some examples, determining whether the network traffic conforms to the expected network behavior may include parsing the network traffic to determine at least one of a source application, a destination, and a payload of the network traffic. In some examples, determining whether the network traffic conforms to the expected network behavior may include determining whether the source application is expected to communicate with the destination. In some examples, determining whether the network traffic conforms to the expected network behavior may include determining whether the source application is expected to send the payload to the destination.

In some examples, modifying the network traffic may include at least one of blocking the network traffic between a source application and a destination that does not conform to the expected network behavior, and changing a destination of the network traffic based on the expected network behavior. In some examples, modifying the network traffic may include changing a payload of the network traffic by removing data from the payload which does not conform to the expected network behavior.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
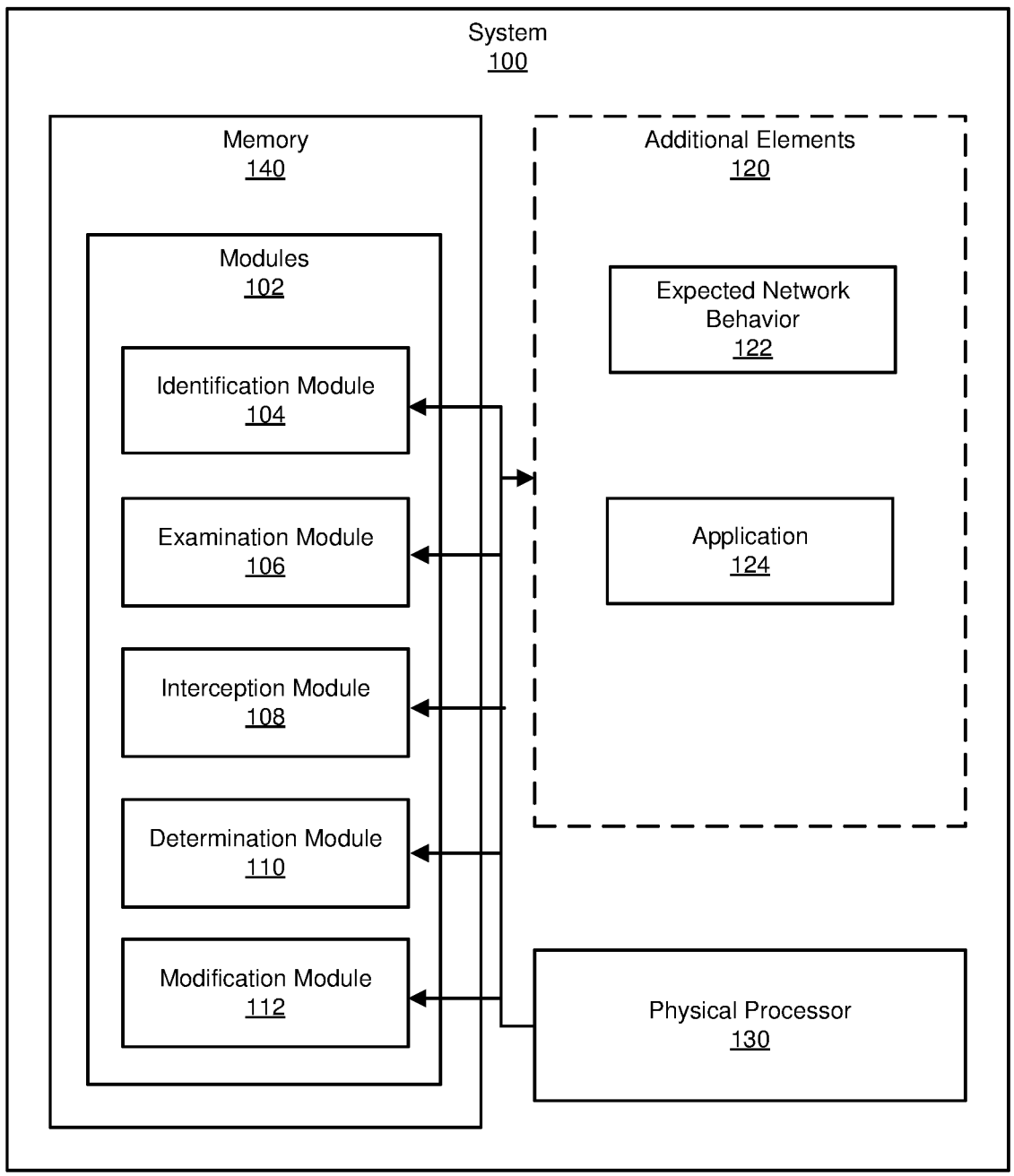
FIG. 1 is a block diagram of an example system for tuning application network behavior.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for tuning application network behavior. Computing devices, such as mobile devices, may utilize closed operating systems. Closed operating systems may prevent applications from providing network traffic control, as applications may not access machine-level network traffic. Without network traffic control, an attacker may compromise an application and have the compromised application send data to unauthorized devices. Closed operating systems may allow some form of network traffic control, but may not allow granular control over each application's network traffic. For example, closed operating systems may not permit access to certain information such as an origin of suspicious outgoing traffic.

As will be explained in greater detail below, by identifying an application and its expected network behavior, network traffic from the application may be monitored and tuned (e.g., allowed, blocked, and/or shaped). The systems and methods described herein may provide granular tuning of application network behavior on closed operating systems. Rules may be established to allow certain applications to send certain types of data to certain destinations. For example, a backup application may normally connect to a backup server for sending backup contact information. If the backup application begins to upload image data (e.g., photos) to an unknown and/or unwanted server, the uploading may be blocked. In another example, an organization may desire a self-developed application to access their corporate resources but restrict access from other applications. Rules may be established to whitelist the self-developed application to access the corporate resources.

In addition, the systems and methods described herein may improve the functioning of a computing device by improving the ability to detect and address suspicious network behavior from applications without altering the underlying closed operating system. These systems and methods may also improve network security by providing granular tuning of application network traffic on closed operating systems.

Figure 2:
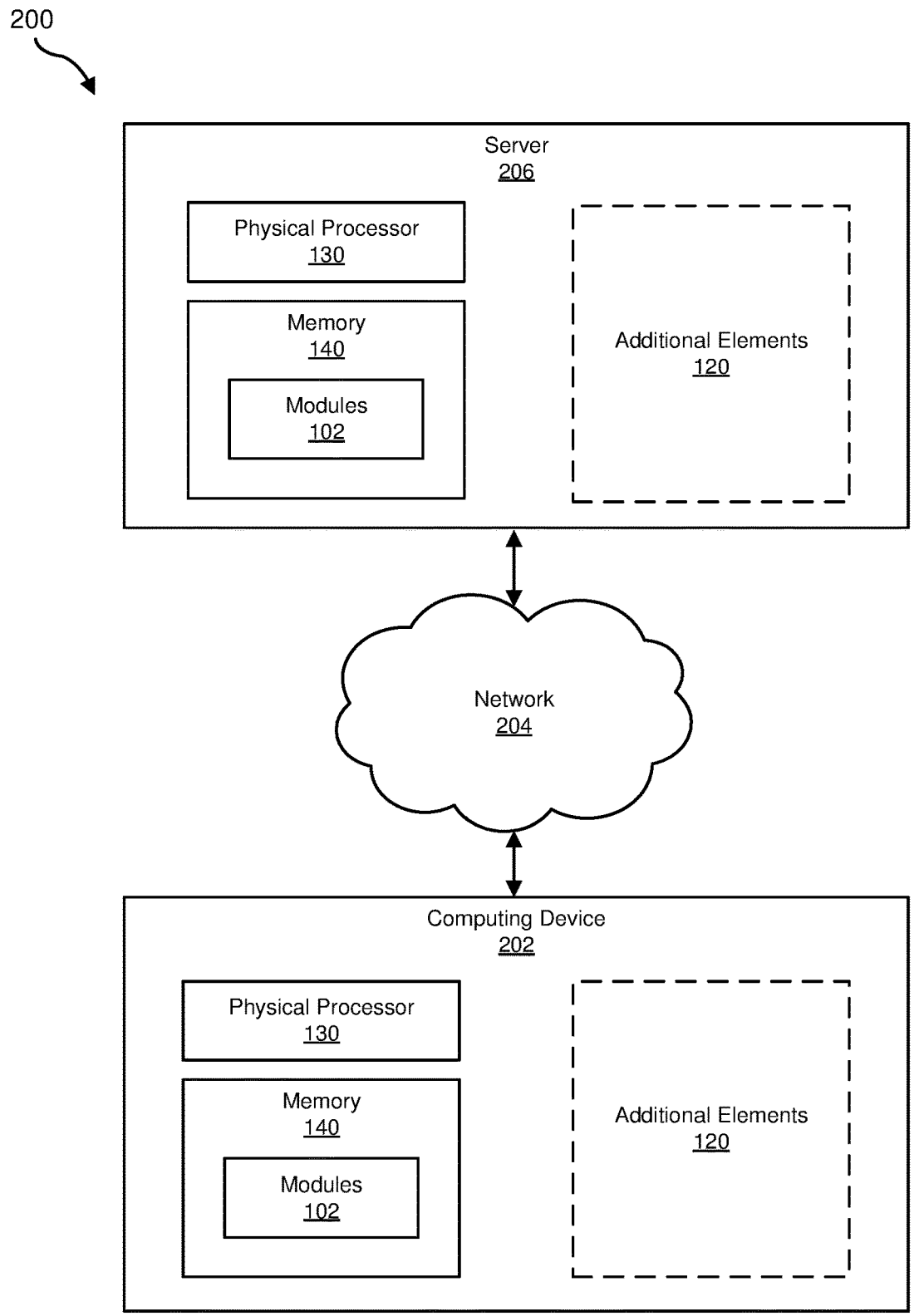
FIG. 2 is a block diagram of an additional example system for tuning application network behavior.

The following will provide, with reference to FIGS. 1-2, detailed descriptions of example systems for tuning application network behavior. Detailed descriptions of corresponding computer-implemented methods will also be provided in connection with FIG. 3. Detailed descriptions of tuned application network behavior will be provided in connection with FIGS. 4-5. In addition, detailed descriptions of an example computing system and network architecture capable of implementing one or more of the embodiments described herein will be provided in connection with FIGS. 6 and 7, respectively.

FIG. 1 is a block diagram of an example system 100 for tuning application network behavior. As illustrated in this figure, example system 100 may include one or more modules 102 for performing one or more tasks. As will be explained in greater detail below, modules 102 may include an identification module 104, an examination module 106, an interception module 108, a determination module 110, and a modification module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate tuning application network behavior. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as an expected network behavior 122 and an application 124. Expected network behavior 122 and/or application 124 may be stored on a local storage device, such as memory 140, or may be accessed remotely. Application 124 may be an application which runs on system 100, and which requires communication to a remote computing device. Expected network behavior 122 may include data describing and/or defining network communications that may be expected from application 124. Expected network behavior 122 may include, for example, descriptions of source application, destination, payload or type of data communicated, and other network communication characteristics.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to tune application network behavior. For example, and as will be described in greater detail below, one or more of modules 102 may cause computing device 202 and/or server 206 to recite steps of method claim using FIG. 2.

Computing device 202 generally represents any type or form of computing device capable of reading computer-executable instructions. For example, computing device 202 may be a mobile client device, such as a smartphone. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading computer-executable instructions. For example, server 206 may be a security server. Additional examples of server 206 include, without limitation, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
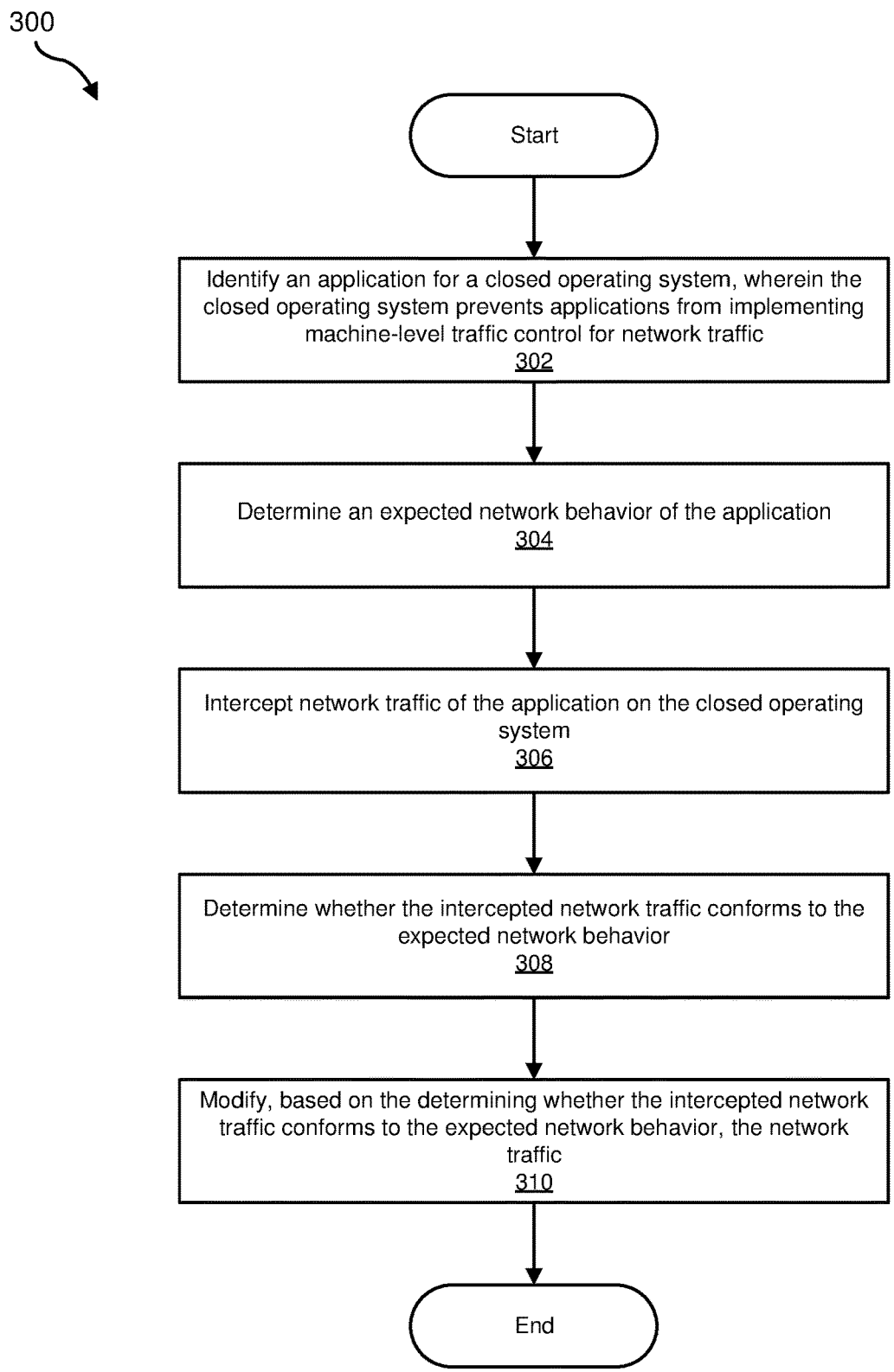
FIG. 3 is a flow diagram of an example method for tuning application network behavior.

FIG. 3 is a flow diagram of an example computer-implemented method 300 for tuning application network behavior. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify an application for a closed operating system. The closed operating system may prevent applications from implementing machine-level traffic control for network traffic. For example, identification module 104 may, as part of computing device 202 and/or server 206 in FIG. 2, identify application 124.

The term "closed operating system," as used herein, generally refers to an operating system having a closed source code, which may limit or prevent applications from accessing lower level device functionality, such as machine-level traffic control for network traffic. Examples of closed operating systems include, without limitation, iOS, Android, Win10S, etc.

The systems described herein may perform step 302 in a variety of ways. In one example, computing device 202 may run a closed operating system. Application 124, running on the closed operating system, may be identified by application name, a version number of the application, software libraries and other shared resources used by application 124, and/or activity of application 124. For example, application 124 running on the closed operating system may access or utilize resources, such as memory, libraries, etc., which may be used for identifying application 124. The identification may be triggered by certain activities of application 124, for example when application 124 initiates a network communication.

At step 304 one or more of the systems described herein may determine an expected network behavior of the application. For example, examination module 106 may, as part of computing device 202 and/or server 206 in FIG. 2, retrieve expected network behavior 122.

The systems described herein may perform step 304 in a variety of ways. In one example, computing device 202 may request and/or receive expected network behavior 122 from server 206.

Expected network behavior 122 may be based on empirical data of network behavior of the application. Application 122 may be run in a secure environment, such as a sandbox, and monitored to determine its expected network behavior 122. For example, server 206 may include a sandbox environment which runs a verified version of application 122 on a virtual machine of the closed operating system. Application 122 may be verified through digital signature, direct access from a developer of application 122, or other verification methods. The sandbox may provide an isolated environment to ensure most or all network traffic from the sandbox is attributable to application 122. Application 122 may be used normally, or simulated with how a user may normally use application 122 to determine, for instance, what type of data or payload is sent to which destinations. The observed network traffic may define expected network behavior 122.

As illustrated in FIG. 3, at step 306 one or more of the systems described herein may intercept network traffic of the application on the closed operating system. For example, interception module 108 may, as part of computing device 202 and/or server 206 in FIG. 2, intercept network traffic of application 122.

The systems described herein may perform step 306 in a variety of ways. In one example, interception module 108, as part of computing device 202, may intercept all network traffic of computing device 202. One or more modules 102, including interception module 108, may be implemented as an application running on computing device 202 capable of tapping all user application network traffic from the closed operating system, similar to a virtual private network (VPN) client. A VPN client may be an end device or software for connecting to VPNs, which connects a private network through a public network.

As illustrated in FIG. 3, at step 308 one or more of the systems described herein may determine whether the intercepted network traffic conforms to the expected network behavior. For example, determination module 110 may, as part of computing device 202 and/or server 206 in FIG. 2, determine whether the intercepted network traffic conforms to expected network behavior 122.

The systems described herein may perform step 308 in a variety of ways. In one example, computing device 202 may inspect the network traffic for characteristics for comparison to network traffic characteristics defined in expected network behavior 122. Determination module 110 may parse the network traffic to determine at least one of a source application, a destination, and a payload of the network traffic. For example, determination module 110 may parse packets of outgoing network traffic and determine from packet headers these characteristics.

Determination module 110 may determine whether the source application is expected to communicate with the destination. Expected network behavior 122 may include destinations that application 124 is expected to communicate with. Determination module 110 may determine whether the source application is expected to send the payload to the destination. The term "payload," as used herein, generally refers to the part of transmitted data that is the actual intended communication. Headers and other metadata may not be considered payload. Determination module 110 may determine whether a type of payload, such as image data, text data, etc., conforms to expected network behavior 122. In some examples, specific files or data may be identified, for example if certain files were blacklisted or whitelisted in expected network behavior 122.

Figure 4:
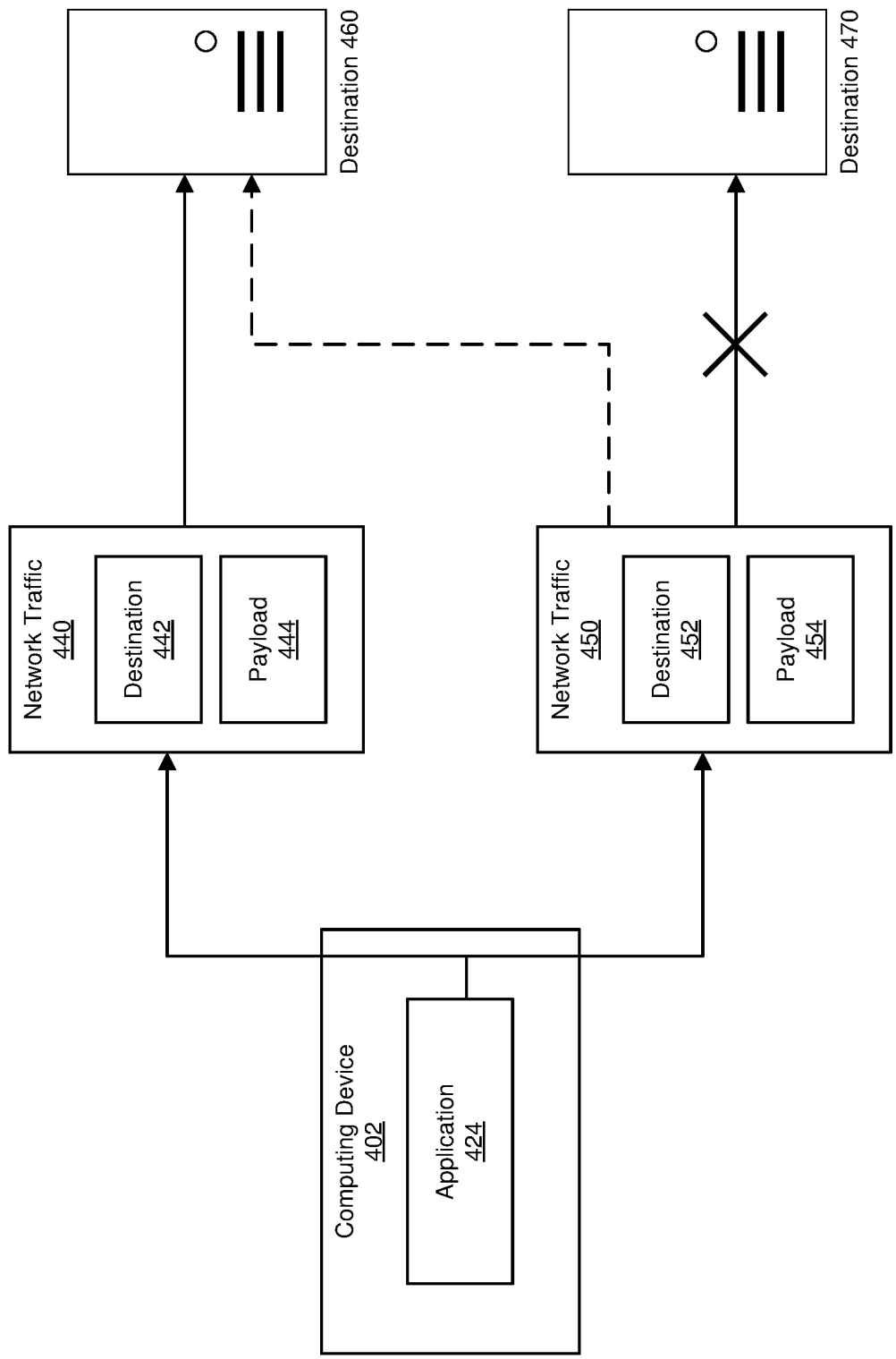
FIG. 4 is diagram of how application network behavior may be tuned according to one or more of the embodiments described and/or illustrated herein.

FIG. 4 illustrates a computing device 402, which may correspond to computing device 202 and an application 424, which may correspond to application 124. Application 424 generates network traffic 440 and network traffic 450. Computing device 402 may have previously identified application 424 and determined its expected network behavior. Network traffic 440 includes a destination 442, which may correspond to a destination 460, and a payload 444. Network traffic 450 may include a destination 452, which may correspond to a destination 470, and a payload 454. Network traffic 440 may conform to the expected network behavior for application 424. Network traffic 450 may not conform to the expected network behavior for application 424.

Figure 5:
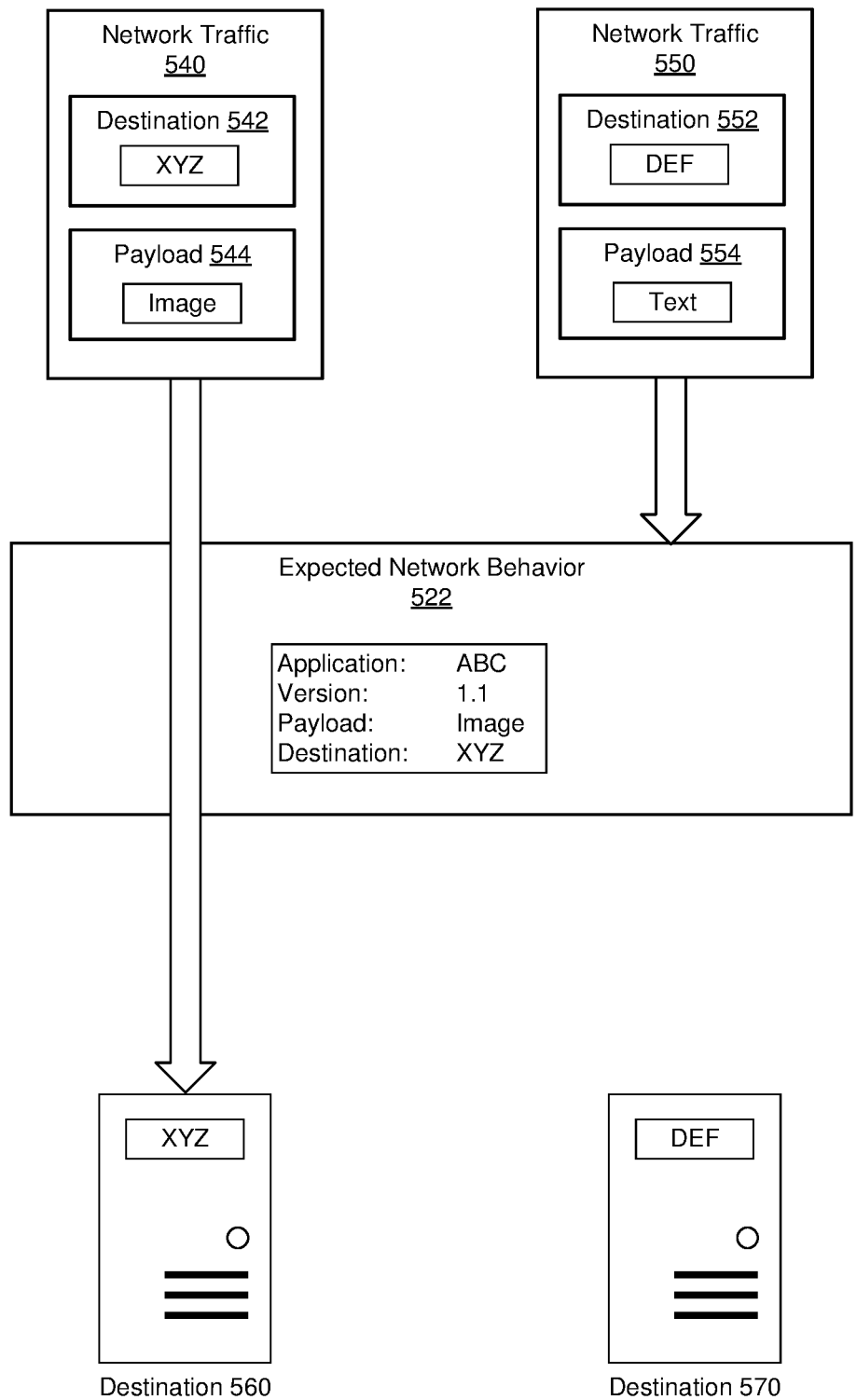
FIG. 5 is a diagram of using expected network behavior for tuning application network behavior according to one or more of the embodiments described and/or illustrated herein.

FIG. 5 illustrates expected network behavior 522, which may correspond to expected network behavior 122. Network traffic 540 includes a destination 542, which may correspond to a destination 560, and a payload 544. Network traffic 550 includes a destination 552, which may correspond to a destination 570, and a payload 554.

FIG. 5 illustrates expected network behavior 522 including a description of the expected network behavior for an application "ABC," having a version "1.1," which is expected to send image data, as the payload, to a destination "XYZ." Network traffic 540 and network traffic 550 may be identified as originating from application ABC having version 1.1. Network traffic 540 includes destination 542 "XYZ" which matches the expected network behavior for ABC, and payload 544 of image type data which matches the expected network behavior for ABC. Network traffic 540 may therefore conform to expected network behavior 522. In contrast, network traffic 550 includes destination 552 "DEF" which does not match the expected network behavior for ABC, and payload 554 of text type data which does not match the expected network behavior for ABC. Thus, network traffic 550 may not conform to expected network behavior 522. Conforming to the expected network behavior may require strictly adhering to rules relating to specified characteristics, as in FIG. 5. For example, the rules may define specific applications communicating specific content to specific destinations. In other examples, conforming to the expected network behavior may be looser adherence, for instance if the expected network behavior defined acceptable ranges and/or multiple acceptable values for the network traffic characteristics.

Returning to FIG. 3, at step 310 one or more of the systems described herein may modify, based on the determining whether the intercepted network traffic conforms to the expected network behavior, the network traffic. For example, modification module 112 may, as part of computing device 202 and/or server 206 in FIG. 2, modify the network traffic.

The systems described herein may perform step 310 in a variety of ways. In one example, modification module 112 may not modify the network traffic when the network traffic conforms to the expected network behavior. For example, in FIG. 4, network traffic 440 may not be modified and therefore may not be prevented from reaching destination 460. In FIG. 5, network traffic 540 may conform to expected network behavior 522 and therefore permitted to reach destination 560 "XYZ."

Modification module 112 may block the network traffic between a source application and a destination that does not conform to the expected network behavior. For example, in FIG. 4, network traffic 450 may be blocked from reaching destination 470. In FIG. 5, network traffic 550 may not conform to expected network behavior 522 and therefore blocked from reaching destination 570 "DEF."

Modification module 112 may change a destination of the network traffic based on the expected network behavior. For example, in FIG. 4, network traffic 450 may be redirected to an expected destination such as destination 460.

Modification module 112 may change a payload of the network traffic based on the expected network behavior. For example, in FIG. 5, payload 554 (e.g., having a payload type of "Text"), may not conform with expected network behavior 522 (e.g., having a payload type of "Image"). Payload 554 may be changed to conform to expected network behavior 522. For instance, non-conforming data, such as text data, may be removed from payload 554. Conforming data may remain unchanged.

Thus, one or more aspects of the intercepted network traffic may be modified to conform with the expected network behavior. Once the modified network traffic conforms with the expected network behavior, the modified network traffic may be accordingly sent to its destination.

As explained above in connection with example method 300 in FIG. 3, the application network behavior tuning software described herein may run on a closed operating system of a smartphone. An application also running on the closed operating system may be identified, for example in response to and in connection with network traffic. An expected network behavior of the application may be determined, for example by monitoring legitimate network activity of the application. The application may be monitored in a controlled environment such as a sandbox on the smartphone, or on a server running an instance of the closed operating system.

Once the application and its expected network behavior are determined, the tuning software may analyze the network traffic, for instance parsing the network traffic to determine which application sent the network traffic, what is being sent, and where it is being sent. If the network traffic from the application matches the application's expected network traffic, the network traffic may be sent. Otherwise, the network traffic may be blocked, or may be shaped, for example by changing its destination to a known destination based on the expected network behavior. Thus, the systems and methods may advantageously provide granular application network traffic tuning, which may conventionally be unavailable on closed operating systems.

Figure 6:
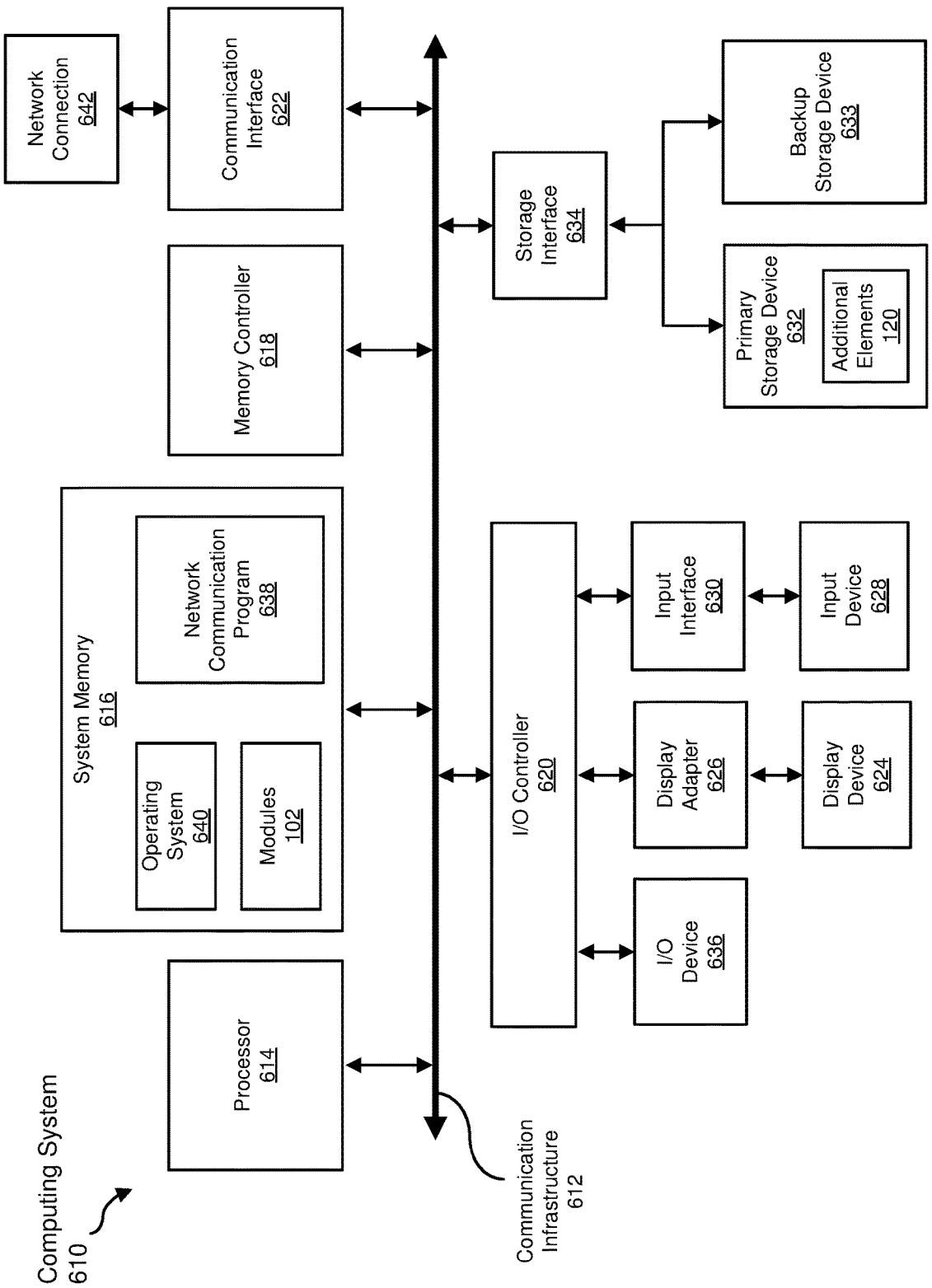
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120, such as expected network behavior 122 and/or application 124 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
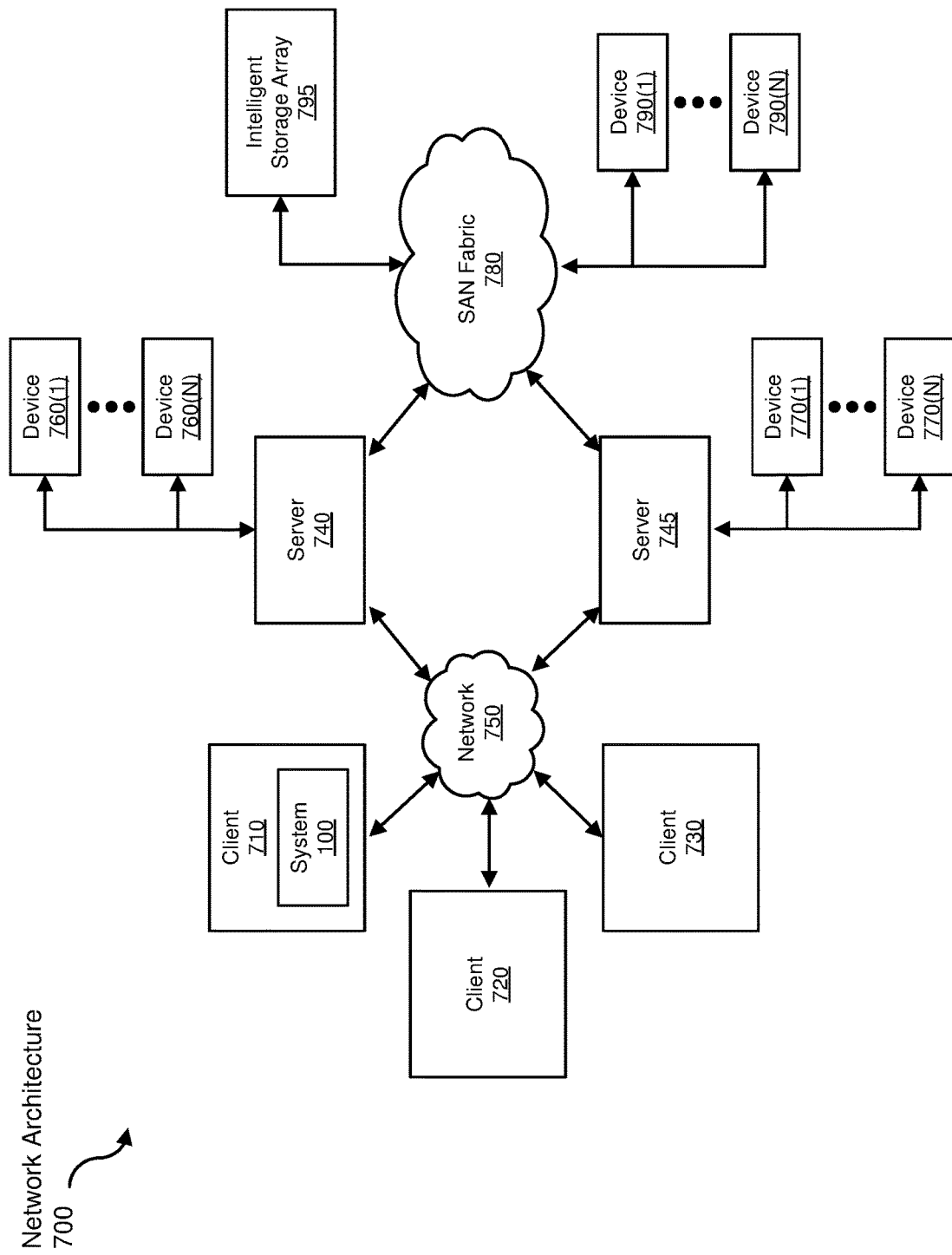
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for tuning application network behavior.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive network traffic to be transformed, transform the network traffic, and use the result of the transformation to send as network traffic. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for tuning application network behavior, at least a portion of the method being performed by a computing device comprising at least one processor, the method comprising:
    identifying an application of one or more applications running on a closed operating system on the computing device, wherein the closed operating system prevents the one or more applications from implementing machine-level network traffic control;
    determining an expected network behavior of the application based on empirical data of previously observed network traffic of the application on the computing device by:
        determining, from the empirical data, an expected destination of network communications from the application on the computing device; and
        determining, from the empirical data, an expected payload for the expected destination,
        wherein the expected network behavior includes an identification of the application and defines, for the identified application, the expected payload for the expected destination;
    intercepting, on the computing device, outgoing network traffic from the closed operating system;
    parsing the intercepted network traffic to determine a source application, a destination, and a payload of the intercepted network traffic;
    determining whether the intercepted network traffic conforms to the expected network behavior when the source application matches the identified application; and
    modifying, based on the determining whether the intercepted network traffic conforms to the expected network behavior, at least one aspect of the intercepted network traffic of the application to conform with the expected network behavior of the application, wherein modifying the intercepted network traffic includes changing the payload of the intercepted network traffic when the payload is non-conforming to the expected payload based on the destination of the intercepted network traffic.

2. The method of claim 1, wherein determining whether the network traffic conforms to the expected network behavior comprises determining whether the source application is expected to communicate with the destination.

3. The method of claim 2, wherein determining whether the network traffic conforms to the expected network behavior comprises determining whether the source application is expected to send the payload to the destination.

4. The method of claim 1, wherein modifying the network traffic comprises blocking the network traffic between a source application and a destination that does not conform to the expected network behavior.

5. The method of claim 1, wherein modifying the network traffic comprises changing the destination of the network traffic based on the expected network behavior.

6. The method of claim 1, wherein modifying the network traffic comprises removing non-conforming data from the payload of the network traffic based on the expected network behavior.

7. The method of claim 1, wherein identifying the application comprises identifying a version number of the application.

8. The method of claim 1, wherein determining the expected network behavior further comprises verifying the application.

9. A system for tuning application network behavior, the system comprising:
    an identification module, stored in memory, for identifying an application of one or more applications running on a closed operating system on the system, wherein the closed operating system prevents the one or more applications from implementing machine-level network traffic control;
    an examination module, stored in memory, for determining an expected network behavior of the application based on empirical data of previously observed network traffic of the application on the system by:
        determining, from the empirical data, an expected destination of network communications from the application on the system; and
        determining, from the empirical data, an expected payload for the expected destination,
        wherein the expected network behavior includes an identification of the application and defines, for the identified application, the expected payload for the expected destination;
    an interception module, stored in memory, for intercepting, on the system, outgoing network traffic from the closed operating system;
    a determination module, stored in memory, for:
    parsing the intercepted network traffic to determine a source application, a destination, and a payload of the intercepted network traffic; and
    determining whether the intercepted network traffic conforms to the expected network behavior when the source application matches the identified application;
    a modification module, stored in memory, for modifying, based on the determining whether the intercepted network traffic conforms to the expected network behavior, at least one aspect of the intercepted network traffic of the application to conform with the expected network behavior of the application, wherein modifying the intercepted network traffic includes changing the payload of the intercepted network traffic when the payload is non-conforming to the expected payload based on the destination of the intercepted network traffic; and
    at least one hardware processor that executes the identification module, the examination module, the interception module, the determination module, and the modification module.

10. The system of claim 9, wherein determining whether the network traffic conforms to the expected network behavior comprises determining whether the source application is expected to communicate with the destination.

11. The system of claim 9, wherein determining whether the network traffic conforms to the expected network behavior comprises determining whether the source application is expected to send the payload to the destination.

12. The system of claim 9, wherein modifying the network traffic comprises at least one of blocking the network traffic between a source application and a destination that does not conform to the expected network behavior and changing the destination of the network traffic based on the expected network behavior.

13. The system of claim 9, wherein modifying the network traffic comprises changing a payload of the network traffic by removing data from the payload which does not conform to the expected network behavior.

14. The system of claim 9, wherein determining the expected network behavior further comprises verifying the application.

15. A non-transitory computer-readable medium comprising one or more computer-executable instructions that, when executed by at least one processor of a computing device, cause the computing device to:
- identify an application of one or more applications running on a closed operating system on the computing device, wherein the closed operating system prevents the one or more applications from implementing machine-level network traffic control;
- determine an expected network behavior of the application based on empirical data of previously observed network traffic of the application on the computing device by:
  - determining, from the empirical data, an expected destination of network communications from the application on the computing device; and
  - determining, from the empirical data, an expected payload for the expected destination,
  - wherein the expected network behavior includes an identification of the application and defines, for the identified application, the expected payload for the expected destination;
- intercept, on the computing device, outgoing network traffic from the closed operating system;
- parse the intercepted network traffic to determine a source application, a destination, and a payload of the intercepted network traffic;
- determine whether the intercepted network traffic conforms to the expected network behavior when the source application matches the identified application; and
- modify, based on the determining whether the intercepted network traffic conforms to the expected network behavior, at least one aspect of the intercepted network traffic of the application to conform with the expected network behavior of the application, wherein modifying the intercepted network traffic includes changing the payload of the intercepted network traffic when the payload is non-conforming to the expected payload based on the destination of the intercepted network traffic.

16. The non-transitory computer-readable medium of claim 15, wherein determining whether the network traffic conforms to the expected network behavior comprises determining whether the source application is expected to communicate with the destination.

17. The non-transitory computer-readable medium of claim 15, wherein determining whether the network traffic conforms to the expected network behavior comprises determining whether the source application is expected to send the payload to the destination.

18. The non-transitory computer-readable medium of claim 15, wherein modifying the network traffic comprises at least one of blocking the network traffic between a source application and a destination that does not conform to the expected network behavior and changing the destination of the network traffic based on the expected network behavior.

19. The non-transitory computer-readable medium of claim 15, wherein modifying the network traffic comprises changing a payload of the network traffic by removing data from the payload which does not conform to the expected network behavior.

20. The non-transitory computer-readable medium of claim 15, wherein determining the expected network behavior further comprises verifying the application.

* * * * *